Figure 1:
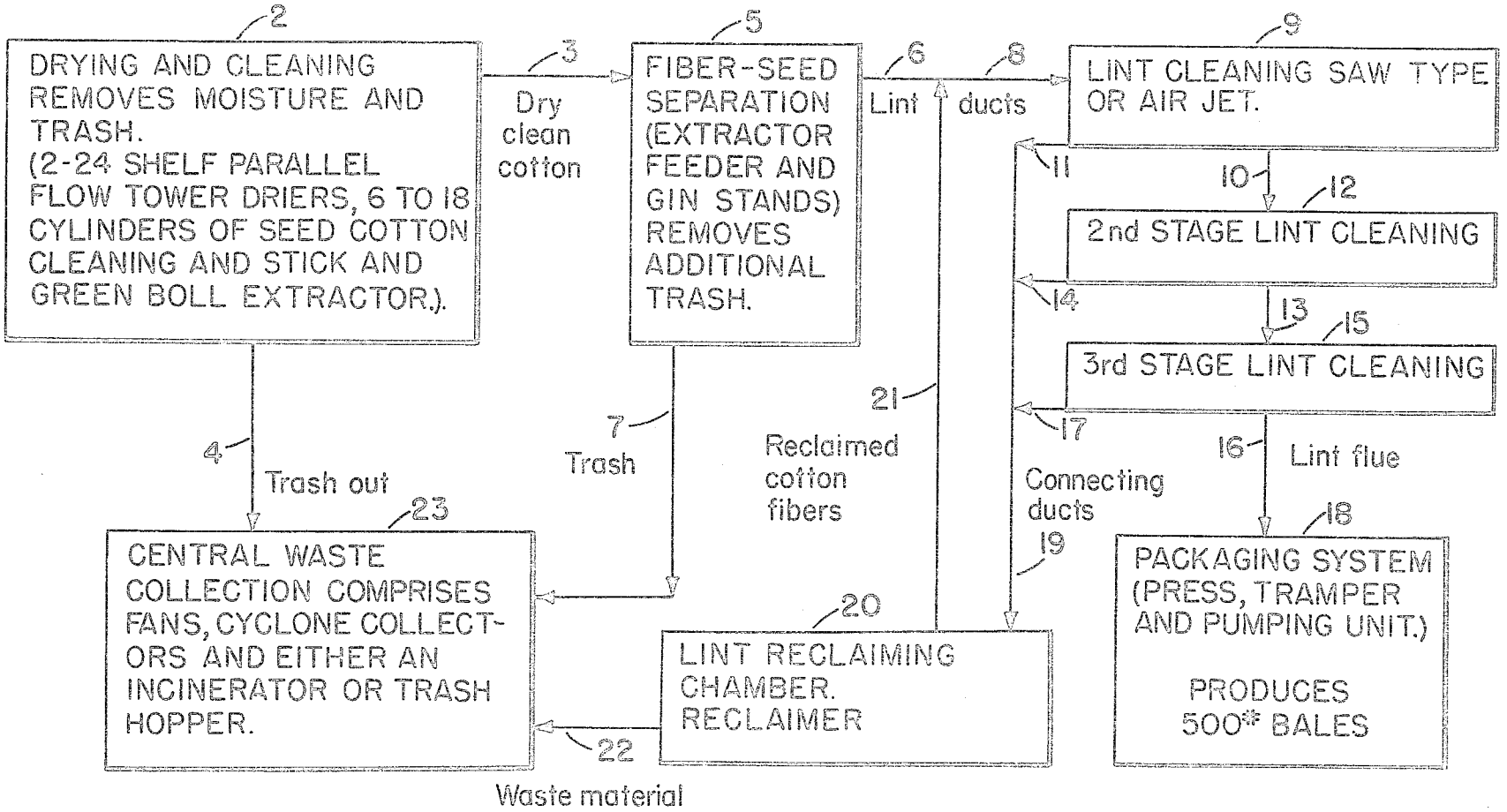
Figure 2:
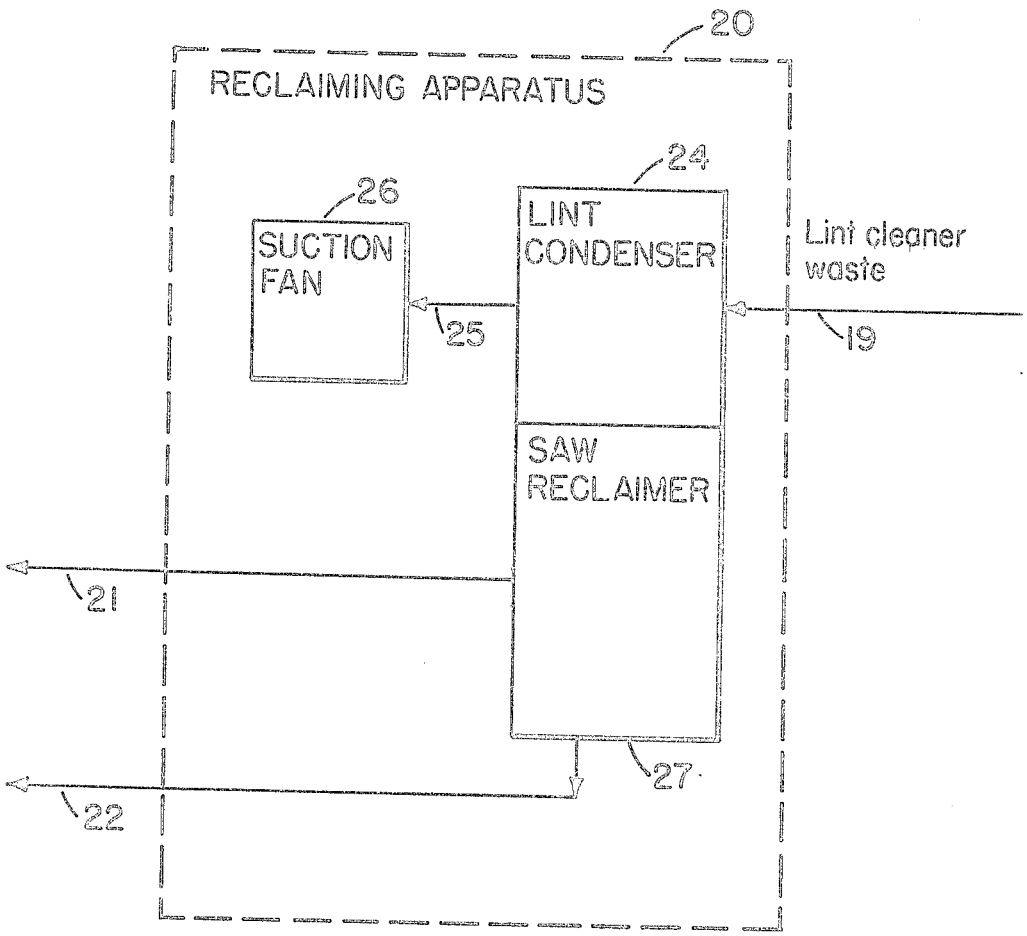
Figure 3:
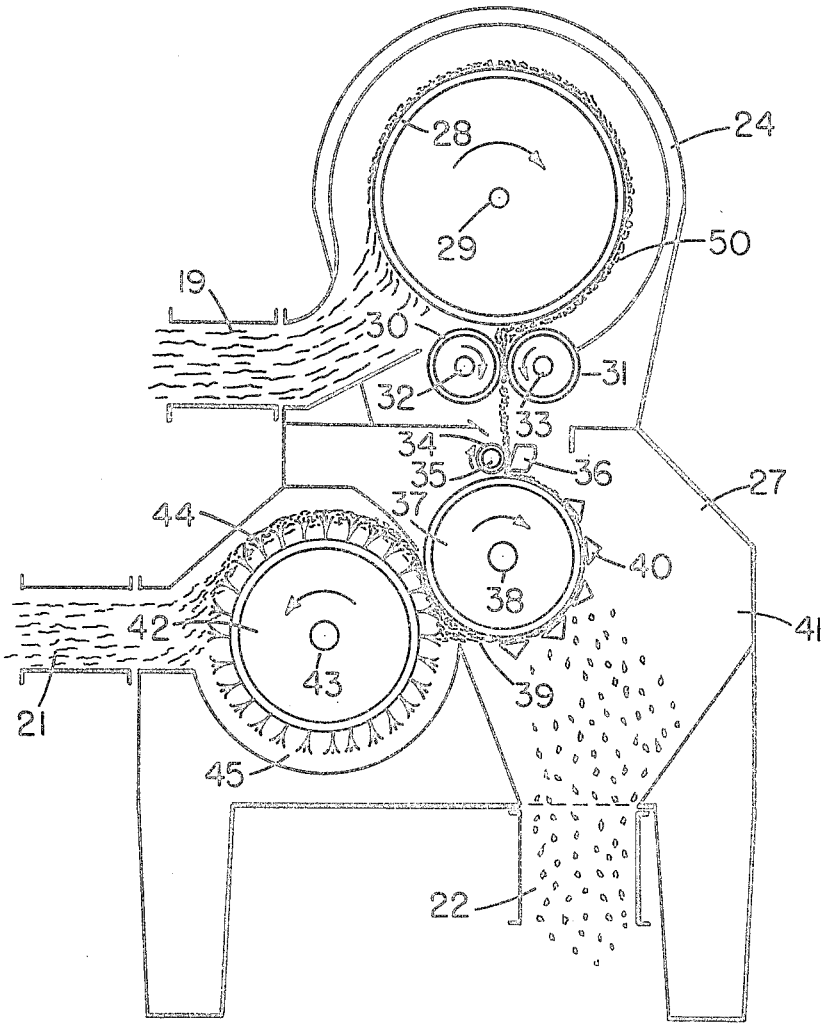
Figure 4:
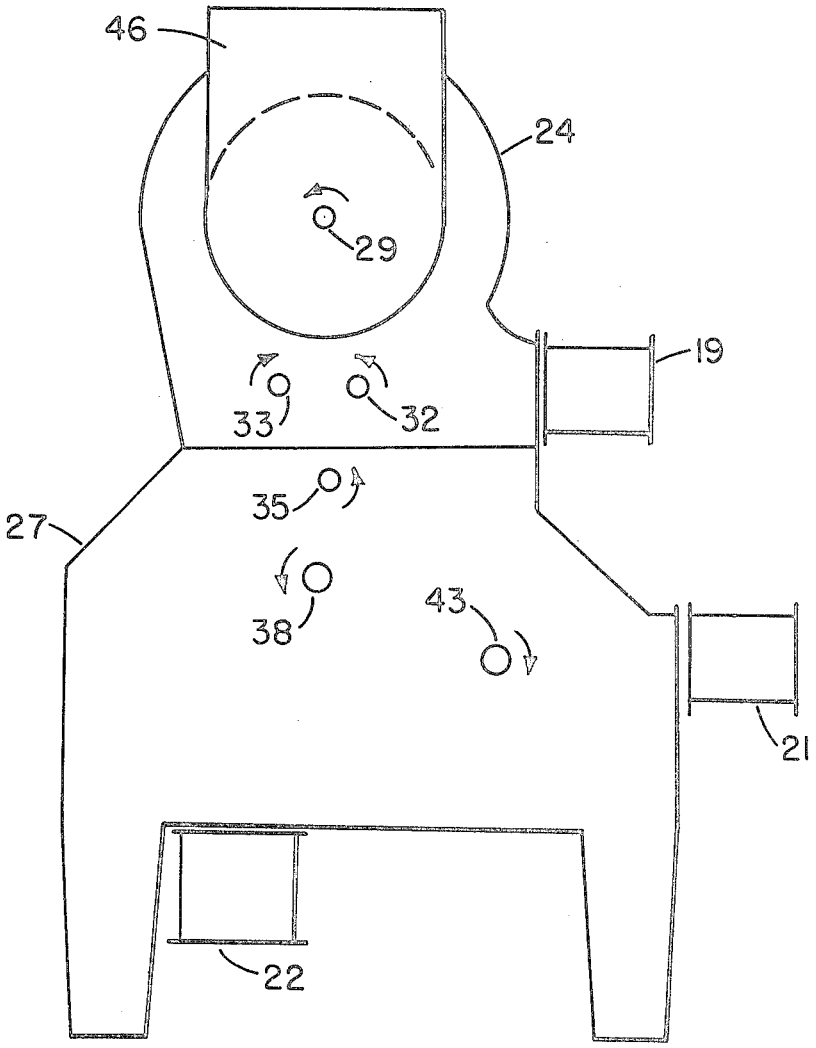
Figure 5:
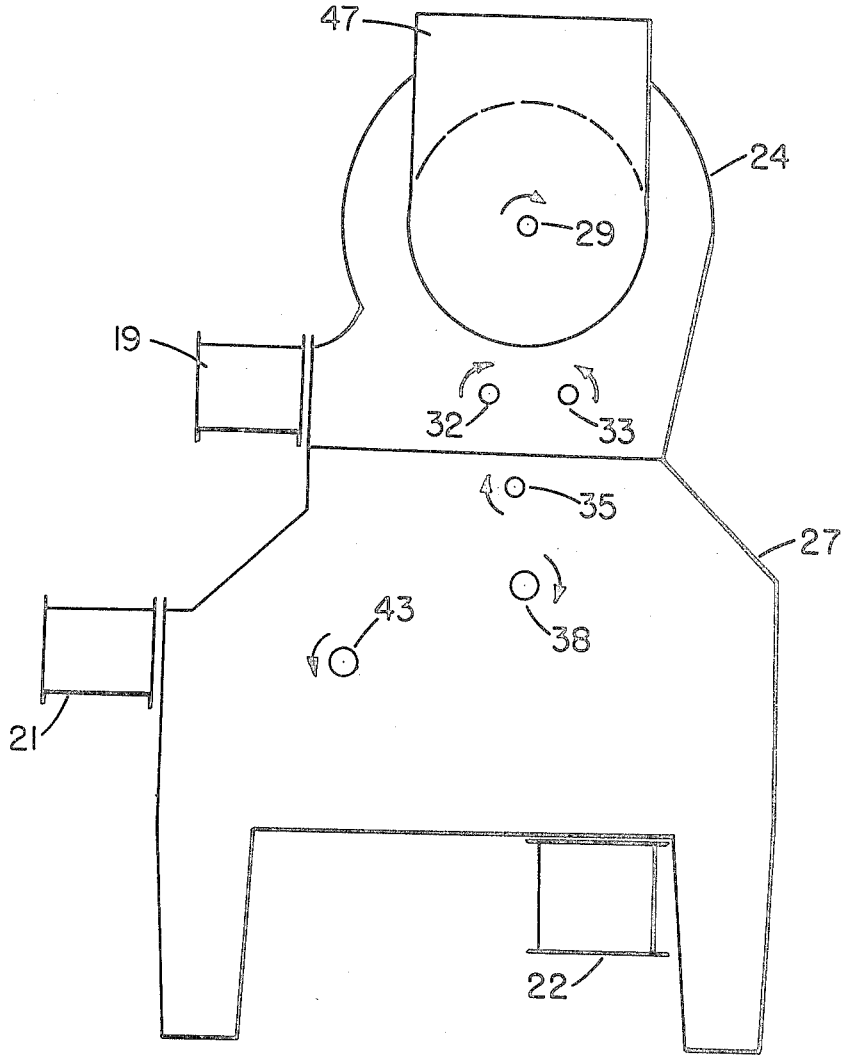

United States Defensive Publication [19] (H) [11] T971,001

Mangialardi, Jr. [43] June 6, 1978

[54] LINT-COTTON RECLAIMING APPARATUS FOR COTTON GINS

[75] Inventor: Gino J. Mangialardi, Jr., Greenville, Miss.

[73] Assignee: The United States of America as represented by the Secretary of Agriculture, Washington, D.C.

[21] Appl. No.: 806,571

[22] Filed: Jun. 14, 1977

[51] Int. Cl.[2] ..... D01B 1/02

[52] U.S. Cl. ..... 19/202; 19/39; 19/66 CC

[57] ABSTRACT

An apparatus to reclaim lint-cotton and return it to the ginning process is disclosed. The apparatus comprises in combination a unique arrangement of condensing cylinders, feed cylinders, saw cylinders, grid bars, and doffing brushes used to collect, reclaim, and feed back lint-cotton into the ginning system.

2 Claims, 5 Sheets Drawing,

11 Pages Specification

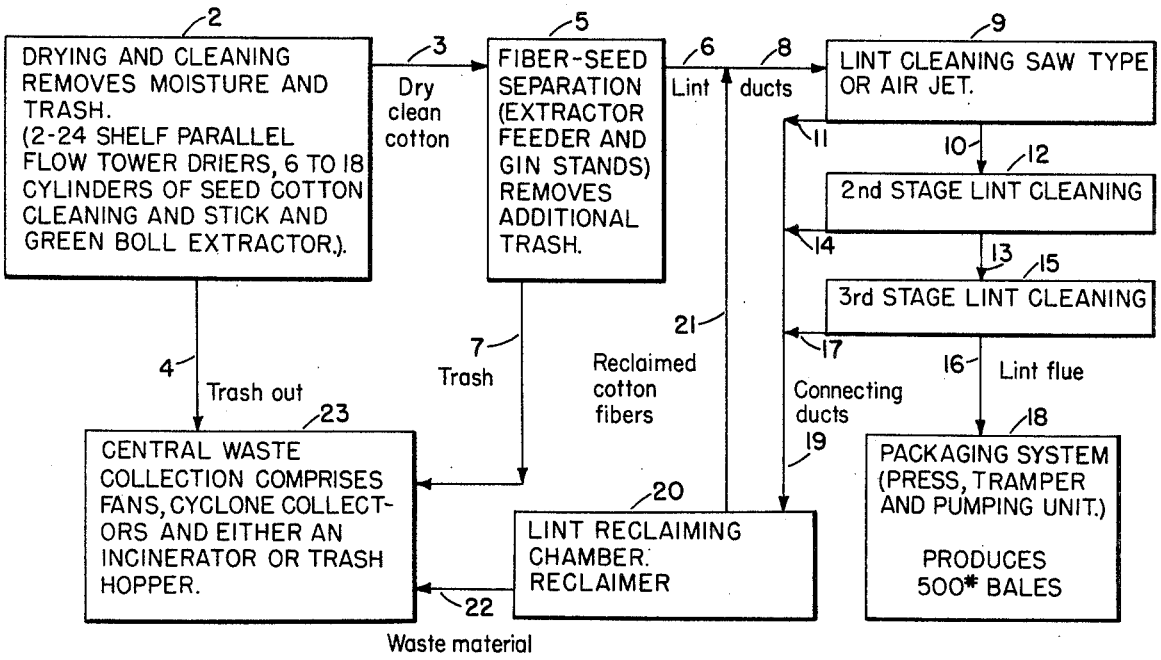

The file of this unexamined application may be inspected and copies thereof may be purchased (849 O.G. 1221, Apr. 9, 1968).